United States Patent [19]
Bianco

[11] Patent Number: 5,370,321
[45] Date of Patent: Dec. 6, 1994

[54] DEFLECTING GUARD FOR A BROADCAST SPREADER

[76] Inventor: Joseph A. Bianco, 1910 4th St., North Brunswick, N.J. 08902

[21] Appl. No.: 183,718

[22] Filed: Jan. 19, 1994

[51] Int. Cl.$^5$ .................................................. A01C 17/00
[52] U.S. Cl. .................................. 239/666; 239/663; 239/685; 239/288
[58] Field of Search ............... 239/663, 665, 666, 685, 239/687, 288, 507, 508, 515, 600; 222/614, 623, 624

[56] References Cited

U.S. PATENT DOCUMENTS

| | | | |
|---|---|---|---|
| 2,418,546 | 4/1947 | Comtois | 239/666 |
| 2,500,682 | 3/1950 | Hoffstetter | 239/666 X |
| 2,661,955 | 12/1953 | Sherer | 239/685 X |
| 2,748,958 | 6/1956 | Mosser | 239/666 |
| 2,954,982 | 10/1960 | Saiberlich | 239/665 |
| 2,956,810 | 10/1960 | Voich et al. | 239/666 |
| 3,235,268 | 2/1966 | McLean | 239/666 X |
| 3,523,648 | 8/1970 | Garber | 239/687 X |
| 3,559,894 | 2/1971 | Murray et al. | 239/687 X |
| 3,790,090 | 2/1974 | Lorenc et al. | 239/666 |
| 4,032,074 | 6/1977 | Amerine | 239/687 X |
| 4,511,090 | 4/1985 | Morgan | 239/666 |
| 4,798,325 | 1/1989 | Block | 239/663 |
| 4,804,145 | 2/1989 | Seymour et al. | 239/666 |
| 4,867,381 | 9/1989 | Speicher | 239/665 |

FOREIGN PATENT DOCUMENTS

| | | | |
|---|---|---|---|
| 1407144 | 6/1965 | France | 239/687 |
| 995614 | 6/1965 | United Kingdom | 239/665 |

*Primary Examiner*—William Grant
*Attorney, Agent, or Firm*—Arthur L. Plevy

[57] ABSTRACT

A deflecting guard device securable to the hopper section of a broadcast spreader includes inclined plates for deflecting dry material as it is scattered by the spreader. First and second inclined plates diverge below the apertured bottom surface of the hopper section and are secured to the hopper section in such a manner that they are axially positionable into a plurality of vertically spaced positions relative thereto. In this manner, the width of the area to which dry materials placed in the hopper section are applied can be controlled. A third inclined plate which interconnects the first and second inclined plates also prevents the dry material from being scattered outside a selected zone of application. The first and second inclined plates can be angularly reoriented relative to the bottom of the hopper section for further adjust the width of the area of application.

17 Claims, 2 Drawing Sheets

DEFLECTING GUARD FOR A BROADCAST SPREADER

BACKGROUND OF THE INVENTION

This invention relates generally to devices for scattering dry lawn chemicals to lawn or yard areas, and more particularly to a detector which may he secured to such devices in order to confine application of such chemicals to a given area.

A typical broadcast or rotary type lawn spreader 10 is illustrated in FIG. 1 and includes a hopper section 12 and a support frame 14 for supporting the hopper section above the ground. As seen in FIG. 1, the support frame 14 comprises two wheels 16 and 18 coupled together by an axle 20. A first bevel gear 22 coupled to the axle and adapted to rotate therewith drivingly engages a second bevel gear 24 having a disk member 26 coupled thereto. Disk member 26 is disposed directly below one or more openings (not shown) in the base of hopper section 12 and is adapted to rotate in response to forward or reverse movement of the spreader. The surface of disk member 26 generally includes vertical projections 27 which contact the material and scatter it by centrifugal force. As will be readily ascertained, dry material placed in the hopper section is red by gravity onto the upper surface of disk member 26 as it rotates, thereby causing the material to be scattered over a wide area as the spreader is moved by the user.

In a spreader of the depicted in FIG. 1, the flow rate of material being fed from the hopper section and delivered to the surface of a lawn area is regulated by adjusting the size of the openings in the base of the hopper section. However, while the amount of material applied to a particular area can he controlled in this manner, it will be appreciated that the area of distribution over which the material is scattered can not. Thus, a primary disadvantage of spreaders this type is that there is no provision for controlling the area of distribution. Without such control, there is a substantial risk of misapplication at the junctions of lawn areas and paved areas (i.e., sidewalks, streets, parking lots, etc.). The risk of misapplication is especially acute in narrow areas such as between sidewalk and curb areas. It will be appreciated that any herbicides, insecticides, or fertilizers inadvertently distributed onto such paved areas may be washed into storm drains and eventually into streams and rivers where they may cause serious damage to fragile wetland ecosystems and public water supplies.

A device for confining the material scattered by a rotary spreader is proposed in U.S. Pat. No. 2,500,682 entitled ADJUSTABLE SHIELD and issued to G. O. Hoffstetter on Mar. 14, 1950. This device requires special mounting provisions in the form of complementary eyes which are mounted in spaced pairs on opposite sides of the hopper section and on two plates. Bolts inserted through the respective eyes secure the plates to corresponding sides of the hopper section in an angular orientation selected to confine the spreading of material to a predetermined area. Although the Hoffstetter device does permit the plates to be angularly reoriented, it is not easily retrofitted onto an existing spreader. Moreover, before a plate member can be reoriented to change the angle of inclination, the bolts in each eye must first be loosened and then retightened after a desired orientation has been found.

Accordingly, it is a principal object of the present invention to provide a deflecting guard which may be retroactively fitted to a variety of existing rotary or broadcast spreaders of various dimensions and which can be easily adjusted to confine the application of dry materials to a selected area, thereby avoiding the disadvantages of prior art shield devices.

SUMMARY OF THE INVENTION

The aforementioned objective, as well as others which will become apparent to those of ordinary skill in the art, is obtained by a device which is securable to a broadcast spreader of the type including a hopper section having at least one sidewall, an apertured bottom surface, and scattering means, wherein dry material placed in said hopper section may be gravity fed through said apertured bottom surface and scattered by said scattering means.

The guard device comprises deflecting means for deflecting dry material scattered by the scattering means, and securing means for coupling the deflecting means to the hopper section. The securing means preferably includes means for axially positioning the deflecting means at a plurality of vertically spaced positions relative to the apertured bottom surface of the hopper section. In one embodiment, therefore, the securing means comprises first and second means for engaging respective portions of the hopper section side walls, with each of the engaging means including a downwardly extending portion positionable proximate the walls of the hopper section at opposite sides thereof.

Each engaging means includes a channel portion having a base positionable on a top edge surface portion of opposed side walls of the hopper sections. The securing means further includes first and second side members, each of said side members being substantially planar, and first and second connecting means for connecting each side member to a corresponding one of said downwardly extending portions at a plurality of vertically spaced locations. The downwardly extending portions each define an aperture and each of the side members defines a slot alignable with a respective one of the apertures when the hopper section is disposed between the side members. First and second connecting means are insertable into an aperture and slot of said first and second engaging means and side members, respectively, for retaining the side members at a predetermined vertical position relative to the side walls of the hopper.

The deflecting means preferably includes first and second inclined plate members which are coupled to the side members and which diverge at a selected angle to prevent application of material from the spreader beyond an area of corresponding width. The deflecting means further includes means for changing the selected angle to thereby adjust the width of the application area. The means for changing the selected angle includes first and second hinges which pivotably connect the first and second plate members to the first and second side members, respectively. Preferably, the deflecting means further includes means for maintaining the inclined plate members at any selected angle of divergence. In the illustrated embodiment, the maintaining means comprises a substantially planar front member interconnecting the first and second side members, a third inclined plate member depending therefrom, and slidably adjustable fastening means for coupling the first and second inclined plate member to the third inclined plate member at a plurality of spaced locations. The first and second inclined plate members include a respective flange portion defining an aperture therein and the third inclined plate member defines first and second arcuate slots alignable with the apertures of the first and second inclined plate members. The slidably adjustable fastening means comprises a first threaded screw and nut and a second threaded screw and nut, wherein each screw is insertable through a respective aligned aperture and movable through said slot so that the inclined plate members may be moved to any desired angular orientation and retained thereat.

In accordance with the illustrated embodiment, the securing means further includes third means for engaging the front wall of the hopper section. The third engaging means includes a downwardly extending portion positionable proximate the front wall of the hopper section and securable to the front member interconnecting the two side members.

DETAILED DESCRIPTION OF THE INVENTION

Figure 1:
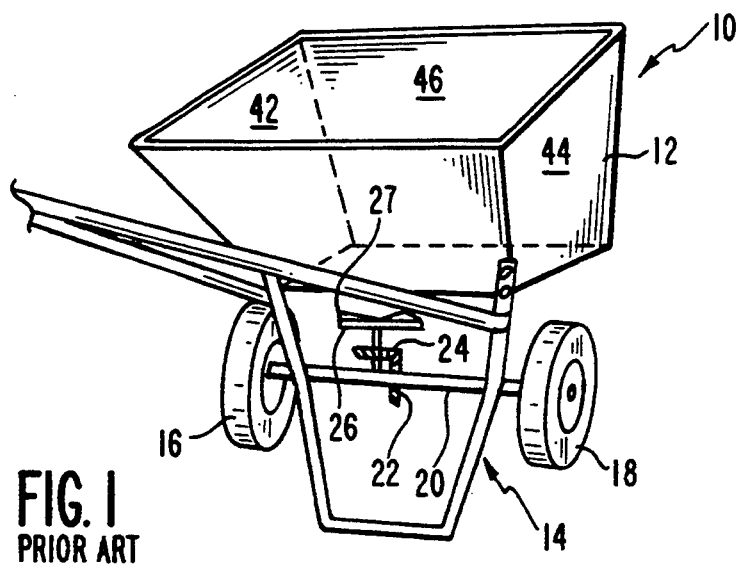
FIG. 1 is a rear perspective view of a conventional spreader of the rotary or broadcast type.
Figure 2:
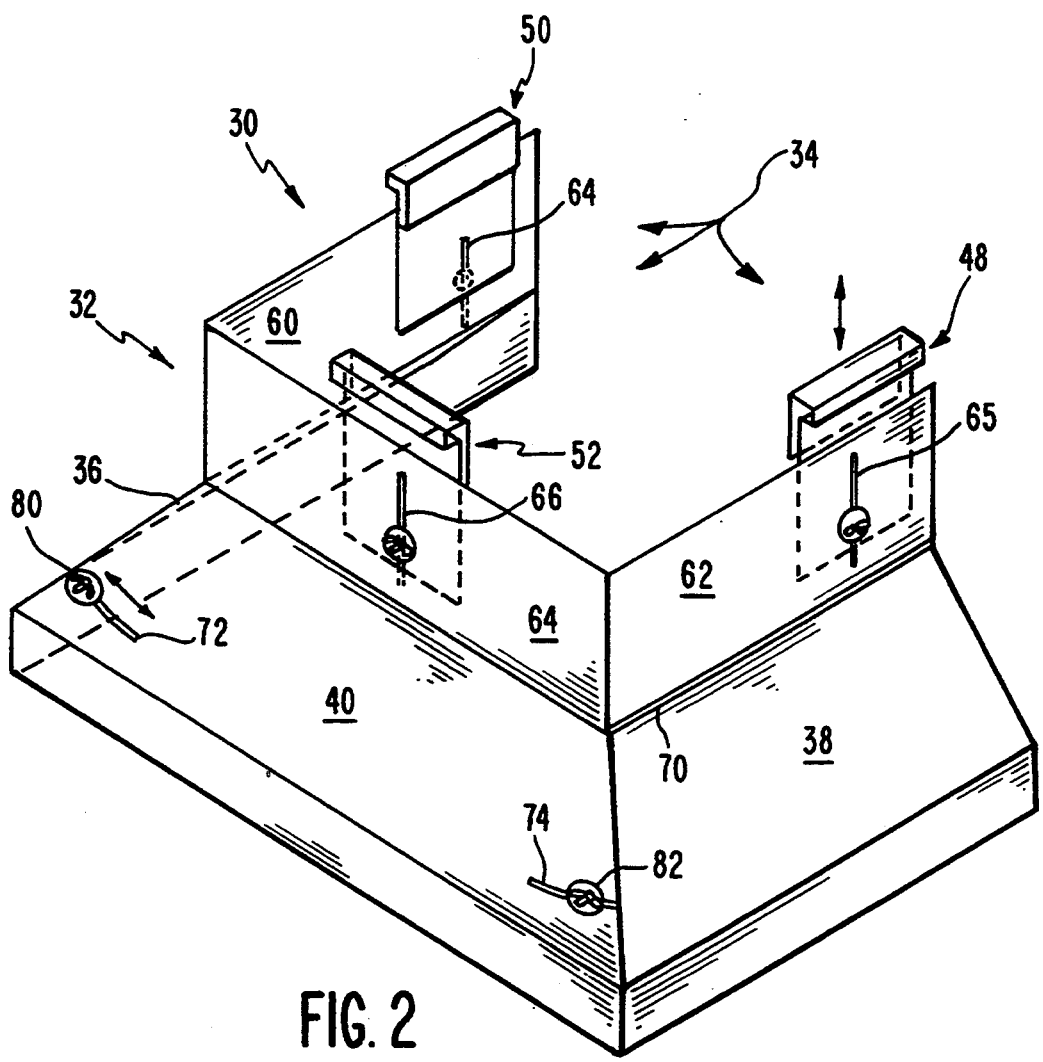
FIG. 2 is a side perspective view of a deflecting guard device in accordance with one embodiment of the present invention which may be coupled to a conventional spreader of the type depicted in FIG. 1.

Referring to FIG. 2, a deflecting guard device according to the present invention is indicated generally at 30. As seen in FIG. 2, guard device 30 comprises an adjustable guard assembly 32 for confining the distribution of dry material such as lawn fertilizer to a preselected area and securing means 34 for securing guard assembly 32 to the hopper section 12 of spreader 10. In the illustrative embodiment of the present invention, the guard assembly comprises a first inclined plate member 36, a second inclined plate member 38, and a third inclined plate member 40 which are positionable adjacent to lateral sidewalls 44 and 42 and front sidewall 46, respectively of hopper section 12 so that they incline downwardly and away therefrom. It will be readily ascertained by those of ordinary skill in the art that the angle at which each plate member is inclined relative to the apertured bottom surface of hopper section 12 and the length by which it extends thereof will determine how far material thrown outwardly by the spreader will be scattered in each direction.

In accordance with one aspect of the present invention, material scattered by the spreader may be confined to a predetermined area by axially positioning the guard assembly at one of a plurality of vertically spaced positions relative to the apertured bottom surface of hopper section 12. It will be readily ascertained that by altering the distance by which the inclined plates of the guard assembly extend below the hopper section bottom, the area of distribution may be selectively modified. Accordingly, and with continuing reference to FIG. 2, securing means 34 includes first and second hook members 48 and 50 which are adapted to engage opposite sidewall portions of the hopper section 12. For additional stability, securing means 34 preferably includes a third hook member 52 for engaging the front wall of hopper section 12. In a manner which will be described later, hook members 48, 50, and 52 are slidably coupled to guard assembly 32 to maintain the same in a desired orientation and alignment relative to the bottom of hopper section 12.

Figure 3:
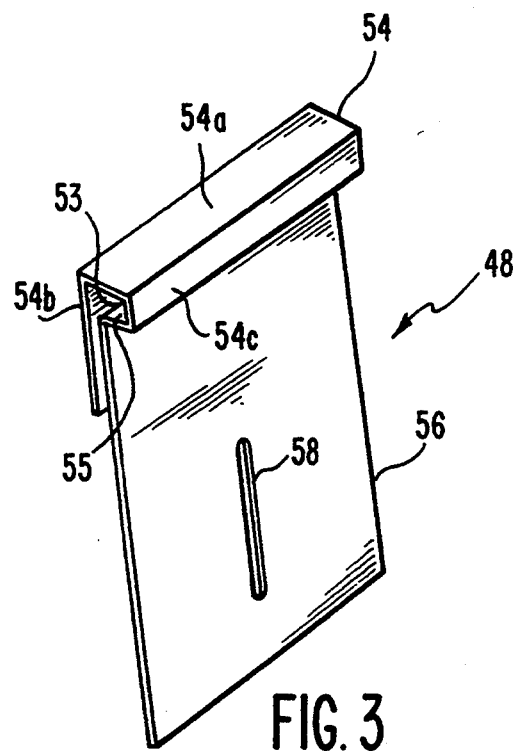
FIG. 3 is an enlarged perspective view of a securing member used to couple the guard assembly to a variety of spreaders in accordance with the embodiment of FIG. 2.

With reference now to FIG. 3, a typical hook member 48 is illustrated and is shown having a channel section 54 and a downwardly depending section 56. Channel section 54 defines a channel 53 dimensioned to receive an upper peripheral edge portion of a hopper section sidewall and includes a base portion 54a positionable in supported relation thereon and side portions 54b and 54c which are positionable adjacent the internal and external surfaces of the hopper section sidewall. Downwardly depending section 56, to which guard assembly 32 is coupled, may be configured as a planar section contiguous with side portion 54c. However, to facilitate attachment to spreaders of the type equipped with a peripheral lip on the top edge surface of the hopper section sidewalls, channel section 54 is preferably provided with an inwardly directed portion 55 contiguous with side portion 54c and extending parallel to base portion 54a. As such, downwardly depending section 56 is contiguous with inwardly directed portion 55. Thus, the upper portion of channel 53 is dimensioned to accommodate the lip of the hopper section, if present, and the inner surfaces of side portion 54b and depending section 56 are adapted to engage the inner and outer surfaces of a hopper section sidewall when the inner surface of base portion 54a is supported by the upper edge surface of the hopper section.

Although each hook member has been described as having a channel section for receiving and being supported by the peripheral edge portion of a spreader hopper section, it is contemplated that any suitable means for maintaining the depending section 56 in a selected orientation and position relative to the side wall or walls of the hopper section may be utilized. Thus, for example, the depending section 56 may alternately be secured to the hopper section by clamps, mechanical fasteners, or any conventional means for securely engaging a thin sidewall.

With continuing reference to the embodiment depicted in FIG. 3, it will be seen that the downwardly depending section 56 of each hook member as 48 is disposed in a substantially vertical plane. For a purpose which will now be explained, an aperture 58 dimensioned to receive a mechanical fastener (not shown) is defined therein.

Returning to FIG. 2, it will be observed that first and second side members 60 and 62 are coupled to inclined plate members 36 and 38. Front member 64 is likewise coupled to front inclined plate member 40 and interconnects the first and second side members. In order that each of the front and side members may be aligned with a depending section of a hook member configured in accordance with the embodiment of FIG. 3, each of the interconnected side members and front member is substantially planar and arranged in a vertical plane to define a substantially C-shaped cross section when viewed from above.

To facilitate vertically adjustable coupling of the guard assembly to respective depending sections of the hook members, the front and side members each define a slot 64, 65, and 66 respectively so that when hook members 48, 50 and 52 are positioned on a spreader 10 in the respective locations shown in FIG. 2, the slots are alignable with corresponding apertures thereof. Accordingly, a mechanical fastener 68 selectively positionable within each slot may be utilized to retain the front and side members, and hence guard assembly 32, at any selected position relative to hopper section 12 to confine the scattering of material by the spreader 10 to a correspondingly selected area. It will also be appreciated that since the hook members of the illustrative embodiment are adapted to engage the top edge of any hopper section side wall, the vertical adjustability of the guard assembly relative thereto facilitates retroactive mounting on a variety of existing spreaders notwithstanding wide variations in sidewall height or in the distance of the top edge thereof relative to the ground.

Figure 4:
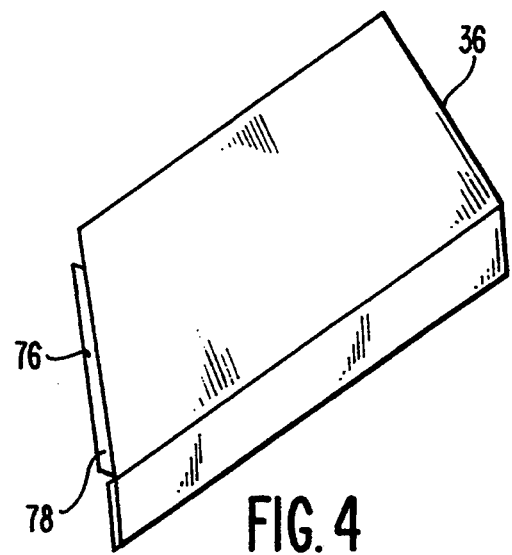
FIG. 4 is an enlarged perspective view of a portion of the guard assembly shown in FIG. 2.

In accordance with another aspect of the invention, finer adjustments to the area to which material scattered by spreader 10 is confined may be made by selectively modifying the respective angles by which diverging inclined plate members 36 and 38 are oriented relative to the horizontal plane in which the rotating spreading means such as disk member 26 is disposed. Thus, as shown in FIG. 2, each inclined plate member as 38 is pivotably coupled to its respective side member as 62 by suitable hinge means such as hinge 70. In the embodiment depicted in FIGS. 2 and 4, front inclined plate member 40 has arcuate slots 72 and 74 at opposite ends thereof. As shown in FIG. 4, each inclined side plate member as 36 includes a corresponding flange portion as 76 having an aperture 78 defined therein. As will be readily ascertained with reference to FIG. 2, each of the inclined side plate members may be independently positioned at any selected angle of inclination and maintained thereat by mechanical fastening means 80 and 82 movable within slots 72 and 74, respectively.

Although the present invention has been described with reference to particular embodiments, workers skilled in the art will recognize that changes may be made in form and detail without departing from the spirit and scope of the invention.

What is claimed is:

1. A deflecting guard device securable to a broadcast spreader of the type including a hopper section having at least one sidewall and a bottom surface, said device comprising:
    an adjustable guard assembly including vertically extending first and second side members, a vertically extending front member interconnecting said side members, and a respective inclined plate member depending from each of said side members and said front member, said inclined plate members depending from each of said side members being hinged directly to their respective side member; and
    securing means for coupling said guard assembly to said at least one sidewall when said hopper section is disposed between said side members, said securing means being adapted to secure said guard assembly to said at least one sidewall at a plurality of vertically spaced locations, and said inclined plate members depending from said side members being slidably connected to and selectively angularly positionable relative to said inclined plate member depending from said front member to vary an area to which a dry material is distributed by said spreader.

2. The device of claim 1, wherein at least one of said side members defines a vertical slot therein, and said securing means includes a projecting member adapted to extend through said slot and retaining means for retaining said projecting member at a selected location therealong.

3. The device of claim 1, wherein the inclined plate members depending from said side members diverge at a selected angle to prevent application of material from said spreader beyond an area of corresponding width, said guard assembly further comprising means for changing said selected angle and thereby the corresponding width of said area.

4. The device according to claim 3 further comprising means for maintaining said side members at a selected angle of divergence.

5. The device according to claim 4, wherein said maintaining means includes first and second slots defined in the inclined plate member depending from said front member, and means projecting from each respective inclined plate member depending from a corresponding slot, wherein each projecting means is movable along each corresponding slot in response to pivoting movement of an associated inclined plate member.

6. The device according to claim 5, wherein said maintaining means further includes locking means for receiving a corresponding projecting means and locking said projecting means within a corresponding slot when an inclined member associated therewith is at a desired incline.

7. A deflecting guard device securable to a broadcast spreader of the type including a hopper section having at least one sidewall and a bottom surface, said device comprising:
    an adjustable guard assembly including first and second side members, a front member interconnecting said side members, and a respective inclined plate member depending from each of said side members and said front member;
    securing means for coupling said guard assembly to said at least one sidewall when said hopper section is disposed between said side members, said securing means being adapted to secure said guard assembly to said at least one sidewall at a plurality of vertically spaced locations, and said inclined plate members depending from said side members being selectively angularly positionable relative to said inclined plate member depending from said front member to vary an area to which a dry material is distributed by said spreader; and wherein said securing means includes means for engaging a peripheral top edge surface of said at least one sidewall and an internal surface of said sidewall proximate thereto.

8. A deflecting guard device securable to a broadcast spreader of the type including a hopper section having at least one sidewall, an apertured bottom surface, and scattering means, wherein dry material placed in said hopper section may be gravity fed through said apertured bottom surface and scattered by said scattering means, said guard device comprising:
    adjustable deflecting means for confining dry material scattered by said scattering means to an area of selected width;
    securing means for coupling said deflecting means to said hopper section said securing means including first and second means for engaging a respective portion of said at least one sidewall, each of said engaging means including a downwardly extending portion positionable proximate said hopper section at opposite side thereof, each of said engaging means further including a channel portion having a base positionable on a top edge surface of opposed sidewalls of said hopper section; and means for locking said deflecting means at a selected one of a plurality of vertically spaced locations relative to said securing means.

9. The device according to claim 8, wherein said securing means further comprises first and second side members, each of said side members being substantially planar, and wherein said locking means includes first and second connecting means for connecting each side member to a corresponding one of said downwardly extending portions.

10. The device according to claim 9, wherein each of said downwardly extending portions defines an aperture and each of said side members defines a slot alignable with a respective one of said apertures when said hopper section is disposed between said side members, and wherein said first and second connecting means are insertable into an aperture and slot of said first and second engaging means and side members, respectively.

11. The device according to claim 9, wherein said deflecting means includes first and second inclined plate members, said inclined plate members being coupled to said side members and diverging at a selected angle to prevent application of material from said spreader beyond an area of corresponding width.

12. The device according to claim 11, wherein said deflecting means further includes means for changing said selected angle to thereby adjust a corresponding width of said area.

13. The device according to claim 12, wherein said means for changing said selected angle includes first and second hinge means for pivotably connecting said first and second plate members to said first and second side members, respectively.

14. The device according to claim 13, wherein said deflecting means further includes means for maintaining said inclined plate members at each selected angle of divergence.

15. The device according to claim 14, wherein said maintaining means comprises a substantially planar front member interconnecting said first and second side members, a third inclined plate member depending from said front member, and slidably adjustable fastening means for coupling said first and second inclined plate member to said third inclined plate member at a plurality of spaced locations.

16. The device according to claim 15, wherein said first and second inclined plate members include a respective flange portion defining an aperture therein and said third inclined plate member defines first and second arcuate slots alignable with the apertures of said first and second inclined plate members, and wherein said slidably adjustable fastening means comprises a first threaded screw and nut and a second threaded screw and nut, wherein each screw is insertable through a respective aligned aperture and movable through said slot so that said first and second inclined plate members may be moved to any desired angular orientation with respect to said third inclined plate member and retained thereat.

17. The device according to claim 15, wherein said securing means further includes third means for engaging a peripheral top edge surface of said hopper section, said third engaging means including a downwardly extending portion positionable proximate said hopper section and securable to said front member.

* * * * *